United States Patent [19]
Murphy

[11] 3,727,477
[45] Apr. 17, 1973

[54] POWER TRANSMISSION

[76] Inventor: Michael Murphy, 29 Cartwright Street, Hyde, England

[22] Filed: May 4, 1971

[21] Appl. No.: 140,292

Related U.S. Application Data

[63] Continuation-in-part of Ser. No. 816,571, April 16, 1969, abandoned.

[52] U.S. Cl.......74/230.17 A, 287/52.05, 287/53 LK
[51] Int. Cl..............................................F16h 11/06
[58] Field of Search..............74/230.17 A, 230.17 B, 74/230.17 C; 287/52.05, 53 LK

[56] References Cited

UNITED STATES PATENTS

| | | | |
|---|---|---|---|
| 1,270,533 | 6/1918 | Lombard | 74/230.17 C |
| 2,201,357 | 5/1940 | Twomley | 74/230.17 C |
| 2,202,553 | 5/1940 | Heyer | 74/230.17 B |
| 2,257,744 | 10/1941 | Heyer | 74/230.17 A |
| 2,277,004 | 3/1942 | Reeves | 74/230.17 A |
| 2,278,739 | 4/1942 | Reeves | 74/230.17 A |
| 2,310,081 | 2/1943 | Hill | 74/230.17 C |
| 2,812,666 | 11/1957 | Huck | 74/230.17 C |
| 3,293,930 | 12/1966 | Schlesinger et al. | 74/230.17 C |

Primary Examiner—C. J. Husar
Attorney—Ralph Bailey

[57] ABSTRACT

The invention concerns power transmission involving rotation of a member by means of a driven shaft on which the member is mounted and where axial movement of the whole or part of the member relative to the shaft is required, and deals with the problem of fretting corrosion in such transmissions. The invention involves the provision of a shaft, a member specially a V-pulley having a fixed flange, and an axially adjustable flange mounted thereon and a plurality of roller bearings disposed in complementary arcuate grooves, between the shaft and the member. The roller bearings are adapted to support the member on the shaft in axially slidable relationship therewith and with a clearance maintained therebetween, and at the same time provide a rotary driving connection between the shaft and the member, and continually to adjust themselves by rotation in one direction only, during rotation of the shaft and the member, in response to imposed stresses, whereby the incidence of fretting corrosion is substantially precluded.

9 Claims, 6 Drawing Figures

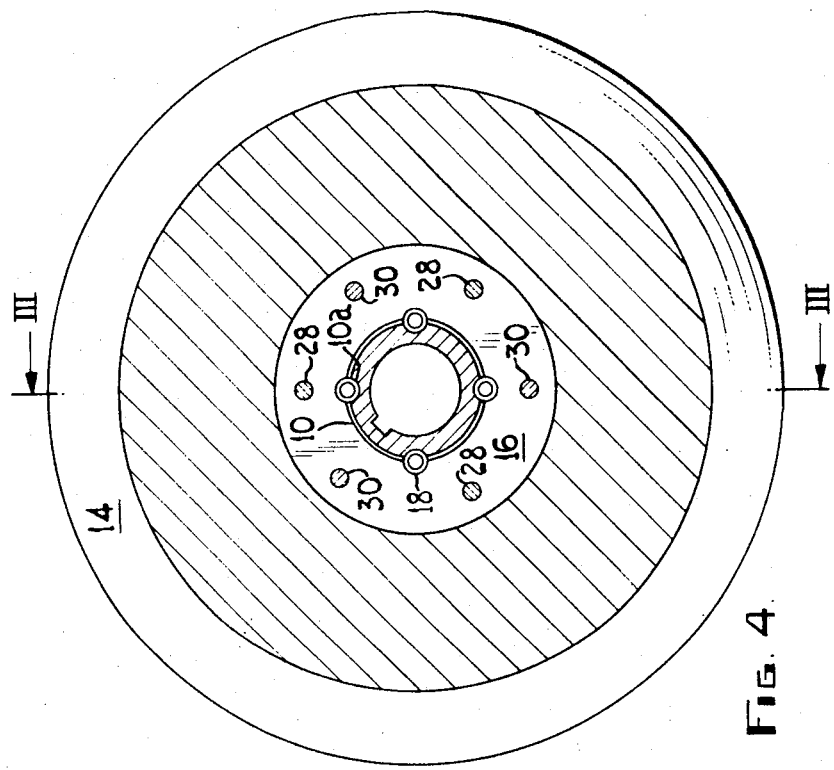
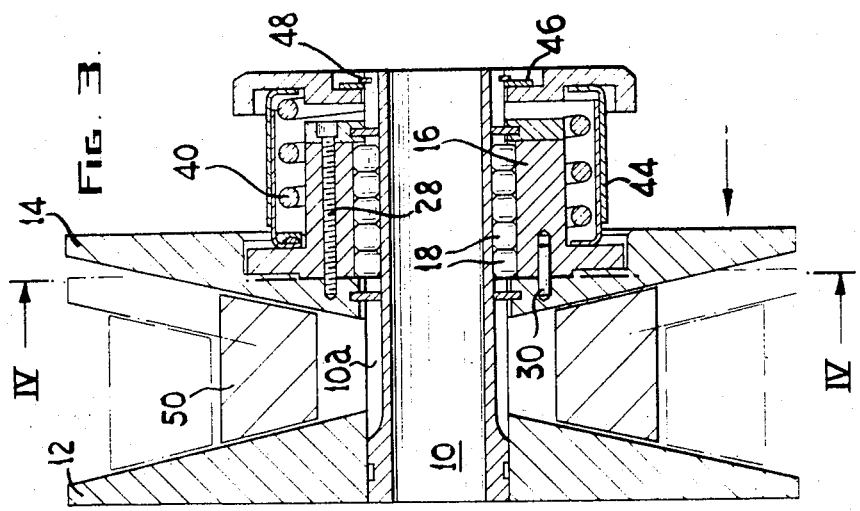

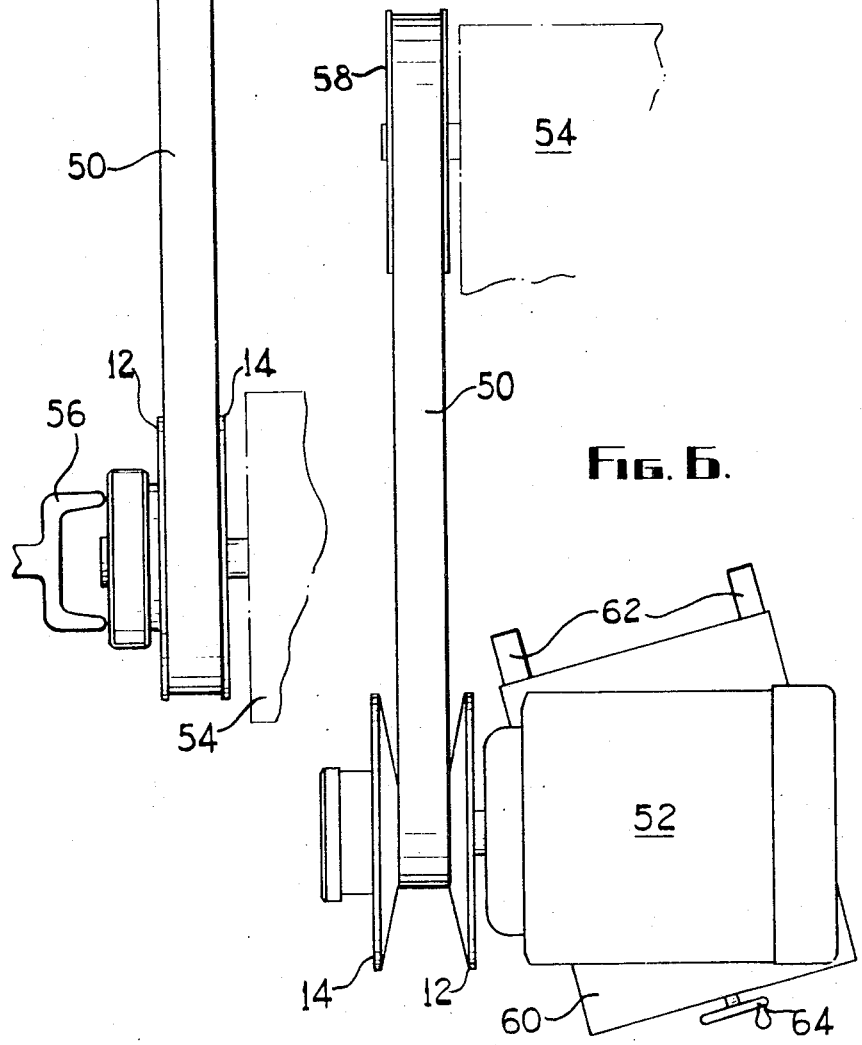

POWER TRANSMISSION

This invention is a continuation-in-part of application Ser. No. 816571 filed on Apr. 16, 1969, now abandoned and concerns power transmission in circumstances where a member is to be rotated and at the same time axial movement of a whole or part of the member relative to a shaft on which it is mounted is to be provided for.

There are many instances of such circumstances in industry and a particular example of a transmission of this type is where power is transmitted by means of a belt running in V-pulleys and where, in order to vary the drive, at least one face of each of a pair of pulleys is made axially adjustable. In this way the effective diameter of each V-pulley may be changed. In these and similar transmissions, when the various parts are metallic in nature, the phenomenon of fretting corrosion has been encountered. Thus, for example, after the spacing of the two faces of a V-pulley has been set to give a selected effective diameter, it has been found that the repeated and variable stresses, to which the mounting which enables the relative sideways adjustment of the pulley parts to be carried out is subjected when the transmission is in use, first causes fretting, that is to say the breaking off of small metallic particles, which particles then accumulate, often throughout the mounting structure, and begin to corrode. Frequently, as a result of this phenomenon it eventually becomes quite impossible to effect subsequent adjustment of the pulley.

The object of the present invention is, in transmissions of the type described, substantially to prevent fretting corrosion.

According to one aspect of the present invention there is provided a power transmission comprising in combination:
  a. a shaft,
  b. a member mounted on said shaft with a clearance between said shaft and said member and so as to be axially movable relative thereto,
  c. a set of longitudinal grooves in and spaced around the outer surface of said shaft, the surface of each said groove being arcuate in the transverse direction,
  d. a corresponding set of longitudinal grooves in and spaced around the bore of said member disposed complementarily to said grooves in said shaft, and the surface of each also being arcuate in the transverse direction, whereby said grooves in said shaft and said grooves in said member together form a plurality of elongated passages of generally circular section, and
  e. a series of roller bearings located within each of said passages and with their axes parallel to the axis thereof, the diameter of said bearings corresponding to the diameter of said passage, and serving to support said member on said shaft with said clearance therebetween and to transmit torque between said shaft and said member.

According to another aspect of the present invention a power transmission comprising a combination:
  a. a drive motor,
  b. a driving shaft on said drive motor,
  c. a driven mechanism,
  d. a driven shaft on said driven mechanism
  e. a first V-pulley mounted on one of said shafts and comprising
      a fixed flange and
      an adjustable flange.
  f. a plurality of roller bearings disposed in complementary arcuate grooves between said adjustable flange and said shaft and adapted to support said adjustable flange on said shaft in axially slidable relationship therewith and with a clearance maintained therebetween, and at the same time provide a rotary driving connection between said shaft and said adjustable flange, and continually to adjust themselves within said grooves by rotation in one direction only, during rotation of said shaft and said adjustable flange, in response to imposed stresses whereby the incidence of fretting corrosion is substantially precluded.
  g. means for positively adjusting said adjustable pulley axially of said shaft,
  h. a second V-pulley mounted on the other of the said shafts and comprising
      a fixed flange and
      an adjustable flange,
  i. a plurality of roller bearings disposed in complementary arcuate grooves between said adjustable flange and said shaft and adapted to support said adjustable flange on said shaft in axially slidable relationship therewith and with a clearance maintained therebetween, and at the same time provide a rotary driving connection between said shaft and said adjustable flange, and continually to adjust themselves within said grooves, during rotation of said shaft and said adjustable flange, in response to imposed stresses whereby the incidence of fretting corrosion is substantially precluded,
  j. a spring adapted to urge said adjustable flange of said second V-pulley toward said fixed flange of said second V-pulley, and
  k. a V-belt passing round said V-pulleys.

According to a further aspect of the present invention there is provided a power transmission comprising in combination:
  a. a drive motor,
  b. a driving shaft on said drive motor,
  c. a driven mechanism,
  d. a driven shaft on said driven mechanism,
  e. a non-adjustable V-pulley on said driven shaft,
  f. an adjustable V-pulley on said driving shaft comprising a fixed flange and an adjustable flange,
  g. a plurality of roller bearings disposed in complementary arcuate grooves between said adjustable flange and said shaft and adapted to support said adjustable flange on said shaft in axially slidable relationship therewith and with a clearance maintained therebetween, and at the same time provide a rotary driving connection between said shaft and said adjustable flange, and continually to adjust themselves within said grooves by rotation in one direction only, during rotation of said shaft and said adjustable flange, in response to imposed stresses whereby the incidence of fretting corrosion is substantially precluded,
  h. a spring adapted to urge said adjustable flange towards said fixed flange, i. means for adjusting the position of said driving motor towards and away from said driven mechanism, and j. a V-belt passing round said V-pulleys.

The invention will now be described further with reference to the accompanying drawings in which:

FIG. 3 is a sectional elevation on the line III — III of FIG. 4 of another type of adjustable V-pulley constructed according to the present invention;

FIG. 4 is a sectional end elevation on the line IV — IV of FIG. 3;

Figure 2:
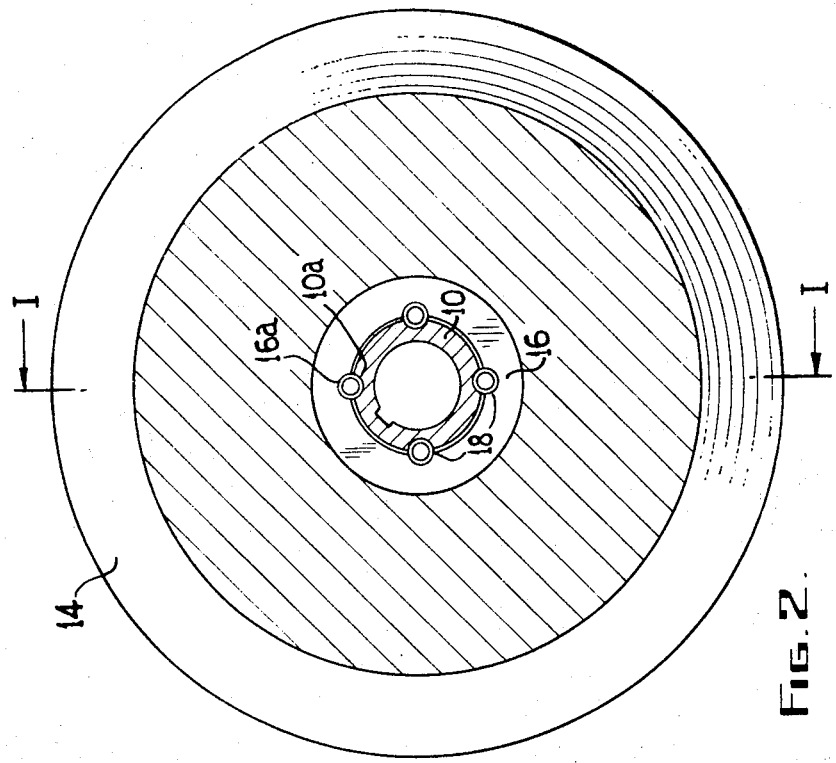
FIG. 2 is a sectional end elevation on the line II — II of FIG. 1.
Figure 1:
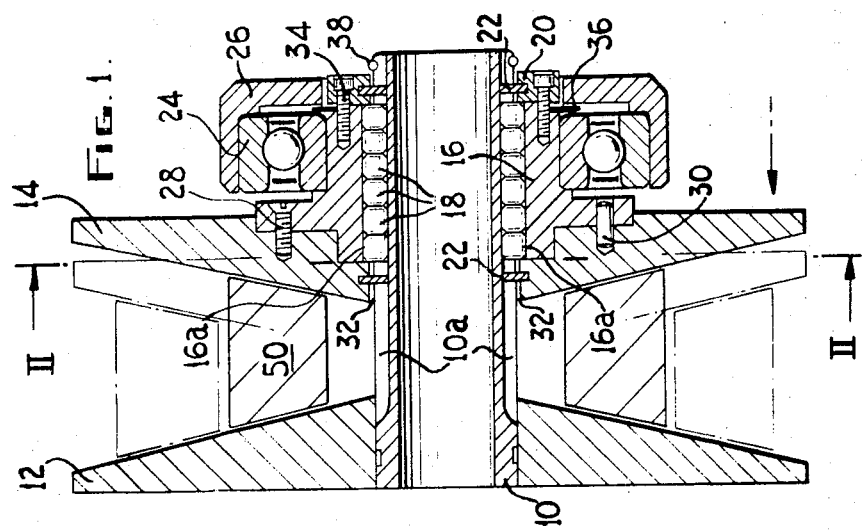
FIG. 1 is a sectional elevation on the line I — I of FIG. 2 of an adjustable V-pulley constructed according to the present invention.

FIG. 5 is a diagram in plan of a variable ratio drive employing one V-pulley as illustrated in FIGS. 1 and 2 and one V-pulley as illustrated in FIGS. 3 and 4; and FIG. 6 is a diagram in plan of a variable ratio drive employing one V-pulley as illustrated in FIGS. 3 and 4 and one conventional non-adjustable V-pulley.

Referring first to FIGS. 1 and 2, the V-pulley and shaft assembly consists basically of a center shaft 10, a fixed V-pulley flange 12, an adjustable V-pulley flange 14, a special bearing arrangement for the adjustable V-pulley flange 14 and a thrust collar mounting against which a controlling arm (not shown in FIGS. 1 and 2) may abut and whereby the adjustable V-pulley flange 14 is adjusted.

The center shaft 10 is in the general form of a hollow cylinder dimensioned to suit the shaft of the mechanism which is to be driven. There are machined in its outer surface four axial equi-spaced grooves 10a each of substantially semi-circular cross section, and extending over the greater part of its length.

The fixed V-pulley flange 12 is rigidly mounted on the ungrooved end of the center shaft 10 whilst the adjustable V-pulley flange 14 is slidably supported on the grooved portion of the center shaft in association with the special bearing arrangement and the thrust collar mounting in the manner now to be described.

The special bearing arrangement consists of a center boss 16, a number of short parallel-type steel rollers 18, a retaining ring 20 and groove sweepers 22. The thrust collar mounting consists of a sealed ball bearing 24 and a thrust collar 26. The center boss 16 is dimensioned so as to engage in counter bores machined in the outer face of the adjustable V-pulley flange 14 and is secured in driven relationship therewith by means of three screws 28 and three driving pins 30. The bore of the center boss 16 has four equi-spaced axial grooves 16a complementary to the grooves 10a in the center shaft 10 and also of substantially semi-circular cross-section. The length of the center boss 16 is such as just to enable six of the steel keying roller bearings 18 to be accommodated side-by-side in each groove 16a and when the adjustable V-pulley flange 14 together with the center boss 16 is mounted on the center shaft 10 the steel rollers 18 of each series are accommodated in complementary pairs of grooves 10a 16a one in the center shaft 10 and one in the center boss 16. The steel rollers 18 are so dimensioned as to support the adjustable V-pulley flange 14 concentrically with the center shaft 10 and with slight clearance 32. As will be seen from FIG. 1 one end steel roller of each series lies adjacent a shoulder in the adjustable V-pulley flange 14. The rollers are held in position within the grooves 16a of the center boss 16 by the retaining ring 20 secured by screws 34 to the outer end of the center boss 16. The adjustable V-pulley flange 14 and the retaining ring 20 are internally and radially grooved to carry neoprene groove sweepers 22 which are so shaped as to follow the outer contours of the center shaft 16 and, therefore, serve as the adjustable V-pulley flange 14 is shifted axially, to keep the parts of the grooves 10a in the center shaft 10 which at any time locate the steel rollers 18 free of foreign matter and to retain lubricant in the bearing space. The sealed ball bearing 24 of the thrust collar mounting is rigidly supported on the center boss 16 as illustrated in the drawings and retained by a circlip 36. The outer race of the bearing 24 supports the thrust collar 26. A round section circlip 38 is located at the end of the center shaft 10 to prevent the adjustable V-pulley flange 14 and its associated parts from coming off the center shaft 10. In use, by manipulating the controlling arm the adjustable V-pulley flange 14 may be caused to slide axially of the center shaft 10 from one position to another and thus cause a V-belt so passing round the pulley to ride at different desired heights within the pulley groove. One alternative position is shown in phantom line. Upon rotation of the shaft and center boss, the rollers 18 adjust themselves by rotation in one direction only in response to a couple imposed on them by the shaft and center boss. The rotation of the rollers assists in the lubrication of the contracting metal surfaces.

Referring now to FIGS. 3 and 4 the general arrangement of the parts is similar to that of FIGS. 1 and 2 and like parts are given the same reference numerals as before, but the center boss 16 is differently shaped so as to be suitable for supporting a compression spring 40 which is held in place by an end cap 42 and the thrust collar mounting is dispensed with. Again the center boss 16 is secured in driving relationship with the adjustable V-pulley flange 14 by means of screws 28 and driving pins 30. The screws 28 also serve to secure the retaining ring 20. The adjustable V-pulley flange 14 and the retaining ring 20 carry groove sweepers 22 as before. Between the center boss 16 of the center shaft 10 four series each of five steel rollers 18 are located, as in the case of the arrangement previously described, in grooves 16a 10a in the center boss 16 and center shaft 10. The compression spring 40 is mounted concentrically on the center boss 16 within a telescopic dust cover 44 between a shoulder on the center boss 16 and the end cap 42 which latter is secured to the end of the center shaft 10 by means of pressure washer 46 and a circlip 48. In FIG. 3 the spring 40 is shown in its compressed position enabling a V-belt 50 to be accommodated well down in the V-pulley but when the belt is free to ride up in the pulley the compression spring 40 will cause the adjustable V-pulley flange 14 automatically to advance towards the fixed flange 12 so as to maintain the driving connection between the belt and the pulley but with the belt higher up within the V of the pulley. This latter position is shown in phantom line.

Referring to FIG. 5 there is shown an arrangement whereby a drive motor 52 is able to drive a driven machine 54 by means of a V-belt the drive ratio being infinitely variable within a certain range. On the shaft of the drive motor 52 is mounted a pulley as described with reference to FIGS. 3 and 4 whilst on the shaft of the driven machine 54 is mounted a pulley as described with reference to FIGS. 1 and 2. A controlling arm 56 is provided for adjusting axially the position of the variable V-pulley flange 14 of the pulley on the shaft of the driven machine 54. In use the distance between the two flanges 12, 14 of the pulley on the shaft of the driven machine 54 may be adjusted by suitable manipulation of the controlling arm 56 which then serves to maintain the pulley in the selected condition and thus the position of the V-belt 50 in the groove of this pulley is fixed. The adjustable V-pulley flange 14 of the pulley on the shaft of the drive motor 52 will, by virtue of the action of its compression spring 40, accommodate itself accordingly, so that the V-belt can transmit the drive. With the separation of the pulley flanges set to a maximum by means of the controlling arm 56 the transmission will operate with the lowest possible gearing whilst with the separation set to a minimum the transmission will operate with the highest possible gearing. The gearing is infinitely variable between ratios which depend on the sizing of the various parts. An arrangement such as that illustrated in FIG. 5 has run for many hundreds of hours at a given ratio without any fretting corrosion arising and at the end of that time the ratio could readily be changed, the adjustable flanges of the pulleys remaining freely slidable on their respective center shafts.

FIG. 6 shows a somewhat different arrangement in which the shaft of the driven machine 54 carries a conventional non-adjustable V-pulley 58 whilst the shaft of the drive motor 52 is fitted with a pulley as described in FIGS. 3 and 4. The drive motor 52 is mounted on a movable platform 60 which in turn is carried by guides 62 along which it may be shifted by a nut and lead screw assembly having a hand wheel 64. The guides 62 are set at an angle of 13° to the line of the V-pulleys when the latter are of conventional 26° included angle so that this line remains undisturbed on adjustment of the drive ratio. By turning the hand wheel 64 the drive motor 52 may be shifted back and forth and the pulley on its shaft will automatically adjust itself to enable the drive to be maintained at a ratio which will depend upon the position of the motor.

The invention is, of course, not limited to the specific details of the embodiments shown in the several figures of the accompanying drawings. In particular, the number of the roller bearings may be varied. There may be three or more series thereof and more than six or less than five in each series. Again each roller bearing may be separated from the next by self-lubricating bearings of slightly smaller diameter. In some cases the roller bearings may not all be the same or perform the same functions. For example some of them may function to support the member on the shaft with the necessary clearance, whilst others may provide the rotary driving connection, both, of course, allowing axial movement between the shaft and the member. In general the invention is not limited in its application to variable drive pulleys but to any situation where, as previously stated, a member is to be rotated and at the same time axial movement of a whole or part of the member relative to the shaft or the like on which the member is mounted and from which the rotary drive is transmitted, is to be provided for.

The provision of roller bearings instead of, for example, ball bearings enables fretting corrosion to be substantially precluded. There is an extremely beneficial and unexpected technical result.

I claim:

1. A power transmission comprising in combination:
   a. a shaft,
   b. a member having a bore extending therethrough mounted on said shaft with a clearance between said shaft and said member so as to be axially movable relative thereto,
   c. a set of longitudinal grooves in and spaced around the outer surface of said shaft, the surface of each said groove being arcuate in the traverse direction,
   d. a corresponding set of longitudinal grooves in and spaced around the bore of said member disposed complementarily to said grooves in said shaft, and the surface of each also being arcuate in the transverse direction, whereby said grooves in said shaft and said grooves in said member together form a plurality of elongated passages of generally circular section, and
   e. a series of keying roller bearings carried for rotation about longitudinal axes thereof within each of said passages and with their axes parallel to the axis of said shaft, the diameter of said bearings corresponding to the diameter of said passage, and serving to support said member on said shaft with said clearance therebetween and to transmit torque between said shaft and said member.

2. A power transmission as set forth in claim 1 in which the grooves of one set thereof are longer than the grooves of the other set thereof.

3. A power transmission as set forth in claim 2 further comprising means for confining each series of roller keying bearings within the shorter grooves.

4. A power transmission as set forth in claim 2 in which said longer grooves are in the shaft.

5. A power transmission as set forth in claim 2 in which the bearings of each series thereof are so disposed and arranged that no substantial axial movement thereof within said shorter grooves is possible.

6. A power transmission as set forth in claim 2 further comprising groove sweepers at each end of each of said shorter grooves adapted to keep those parts of each longer groove in which said bearing elements are at any given time accommodated clear of foreign matter and to retain lubricant in the bearing space in said shorter grooves.

7. A power transmission as set forth in claim 2 in which there are four grooves in each set of grooves.

8. A power transmission comprising in combination
   a. a drive motor,
   b. a driving shaft on said drive motor,
   c. a driven mechanism,
   d. a driven shaft on said driven mechanism,
   e. a first V-pulley mounted on one of said shafts and comprising
      a fixed flange and
      an adjustable flange.
   f. a plurality of roller keying bearings disposed in complementary arcuate grooves between said adjustable flange and said shaft and adapted to support said adjustable flange on said shaft in axially slidable relationship therewith and with a clearance maintained therebetween, and at the same time provide a rotary driving connection between said shaft and said adjustable flange, and continually to adjust themselves within said grooves by rotation in one direction only, during rotation of said shaft and said adjustable flange, in response to imposed stresses whereby the incidence of fretting corrosion is substantially precluded, g. means for positively adjusting said adjustable pulley axially of said shaft, h. a second V-pulley mounted on the other of the said shafts and comprising
a fixed flange and
an adjustable flange, i. a plurality of roller keying bearings disposed in complementary arcuate grooves between said adjustable flange and said shaft and adapted to support said adjustable flange on said shaft in axially slidable relationship therewith and with a clearance maintained therebetween, and at the same time provide a rotary driving connection between said shaft and said adjustable flange, and continually to adjust themselves within said grooves by rotation in one direction only, during rotation of said shaft and said adjustable flange, in response to imposed stresses whereby the incidence of fretting corrosion is substantially precluded, j. a spring adapted to urge said adjustable flange of said second V-pulley toward said fixed flange of said second V-pulley, and k. a V-belt passing round said V-pulleys.

9. A power transmission comprising in combination
a. a drive motor,
b. a driving shaft on said drive motor,
c. a driven mechanism,
d. a driven shaft on said driven mechanism,
e. a non-adjustable V-pulley on said driven shaft,
f. an adjustable V-pulley on said driving shaft comprising a fixed flange and an adjustable flange,
g. a plurality of roller keying bearings disposed in complementary arcuate grooves between said adjustable flange and said shaft and adapted to support said adjustable flange on said shaft in axially slidable relationship therewith and with a clearance maintained therebetween, and at the same time provide a rotary driving connection between said shaft and said adjustable flange, and continually to adjust themselves within said grooves by rotation in one direction only, during rotation of said shaft and said adjustable flange, in response to imposed stresses whereby the incidence of fretting corrosion is substantially precluded,
h. a spring adapted to urge said adjustable flange towards said fixed flange,
i. means for adjusting the position of said driving motor towards and away from said driven mechanism, and
j. a V-belt passing round said V-pulleys.

* * * * *